(12) United States Patent
Fan et al.

(10) Patent No.: US 10,203,535 B2
(45) Date of Patent: Feb. 12, 2019

(54) MOSAIC SCREEN

(71) Applicant: Boe Technology Group Co., Ltd., Beijing (CN)

(72) Inventors: Yang Fan, Beijing (CN); She Lin, Beijing (CN); Xin Wang, Beijing (CN)

(73) Assignee: Boe Technology Group Co., Ltd., Beijing (CN)

(*) Notice: Subject to any disclaimer, the term of this patent is extended or adjusted under 35 U.S.C. 154(b) by 0 days.

(21) Appl. No.: 15/327,766

(22) PCT Filed: Mar. 10, 2016

(86) PCT No.: PCT/CN2016/076047
§ 371 (c)(1),
(2) Date: Jan. 20, 2017

(87) PCT Pub. No.: WO2017/045381
PCT Pub. Date: Mar. 23, 2017

(65) Prior Publication Data
US 2017/0205056 A1 Jul. 20, 2017

(30) Foreign Application Priority Data
Sep. 18, 2015 (CN) .......................... 2015 1 0600928

(51) Int. Cl.
*G09F 13/04* (2006.01)
*G02F 1/1333* (2006.01)
(Continued)

(52) U.S. Cl.
CPC ....... *G02F 1/13336* (2013.01); *A47G 1/0622* (2013.01); *F21V 7/05* (2013.01);
(Continued)

(58) Field of Classification Search
CPC .............. G02B 6/0078; G02B 6/0096; G02F 1/133602–1/133611; G02F 1/13336; G02F 1/133615
See application file for complete search history.

(56) References Cited

U.S. PATENT DOCUMENTS 6,445,373 B1    9/2002  Yamamoto
2006/0181901 A1* 8/2006  Sakai ................... G02B 6/0051
                                                    362/613

FOREIGN PATENT DOCUMENTS

CN    201561336    8/2010
CN    102478172    5/2012
(Continued)

OTHER PUBLICATIONS

International Search Report for PCT/CN2016/076047 dated Jun. 15, 2016.
(Continued)

*Primary Examiner* — Sean Gramling
(74) *Attorney, Agent, or Firm* — Calfee, Halter & Griswold, LLP

(57) ABSTRACT

The present disclosure discloses a mosaic screen. The mosaic screen comprises a box body, a backlight module and a plurality of display modules spliced with each other. The box body comprises four side walls and one box bottom. The plurality of display modules and the box bottom are oppositely fixed on the box body. The backlight module comprises a plurality of lamp panels arranged on the four side walls. Each of the lamp panels comprises: a baseplate, a light source fixing plate, and a light source fixed on the light source fixing plate. The light source fixing plate is connected with a first side of the baseplate close to the display modules, and forms an included angle with the baseplate.

17 Claims, 3 Drawing Sheets

(51) Int. Cl.
*G09F 9/00* (2006.01)
*A47G 1/06* (2006.01)
*F21V 7/05* (2006.01)
*F21V 19/00* (2006.01)
*G02F 1/1335* (2006.01)
*F21Y 115/10* (2016.01)

(52) U.S. Cl.
CPC .... *F21V 19/0015* (2013.01); *G02F 1/133615* (2013.01); *G09F 9/00* (2013.01); *F21Y 2115/10* (2016.08)

(56) References Cited

FOREIGN PATENT DOCUMENTS

| | | |
|---|---|---|
| CN | 102566139 A | 7/2012 |
| CN | 102606956 | 7/2012 |
| CN | 202351582 U | 7/2012 |
| CN | 103077666 A | 5/2013 |
| CN | 204143788 U | 2/2015 |
| CN | 104867479 | 8/2015 |
| CN | 105139759 | 12/2015 |
| JP | 2001228475 | 8/2001 |

OTHER PUBLICATIONS

First Office Action from Chinese Patent Application No. 201510600928.8 dated Apr. 10, 2017.

\* cited by examiner

MOSAIC SCREEN

RELATED APPLICATIONS

The present application is the U.S. national phase entry of PCT/CN2016/076047, with an international filing date of Mar. 10, 2016, which claims the benefit of Chinese Patent Application No. 201510600928.8, filed on Sep. 18, 2015, the entire disclosure of which is incorporated herein by reference.

TECHNICAL FIELD

The present disclosure relates to the field of display technology, particularly to a mosaic screen.

BACKGROUND

With the rapid development of the display technology, the mosaic screen emerges as the times require. The mosaic screen has been widely used in exhibition occasions because it has large scene display effect and can bring immersive visual experience for users.

Specifically, as shown in FIG. 1 and FIG. 2, the mosaic screen comprises a box body 1', a backlight module 2' and a plurality of display modules 3' spliced with each other. The box body 1' is located at peripheral of the plurality of display modules 3', for fixing the plurality of display modules 3'. An exhibition object 4' is placed on the box bottom. The backlight module 2' is located at four side walls of the box body 1', for providing light for all display modules 3'. The backlight module 2' comprises a light source 21' and a diffuser plate 22' arranged on the four side walls of the box body F. The light emitted by the light source 21' irradiates into the whole box body 1 via the diffuser plate 22', thereby providing light for the whole mosaic screen.

In the process of using the mosaic screen with the above structure, because the center area of the mosaic screen is relatively far from the backlight module, thereby causing the brightness of the center area of the mosaic screen to be relatively low, the uniformity of brightness of the mosaic screen is relatively poor. The uniformity of brightness is a ratio of the minimum brightness and the maximum brightness. The smaller the ratio is, the poorer the uniformity of brightness of the mosaic screen is.

SUMMARY

An object of the present disclosure lies in providing a mosaic screen for improving uniformity of brightness of the mosaic screen.

The present disclosure provides a mosaic screen that comprises a box body, a backlight module and a plurality of display modules spliced with each other. The box body comprises four side walls and one box bottom. The plurality of display modules and the box bottom are oppositely fixed on the box body. The backlight module comprises a plurality of lamp panels arranged on the four side walls. Each of the lamp panels comprises: a baseplate, a light source fixing plate, and a light source fixed on the light source fixing plate. The light source fixing plate is connected with a first side of the baseplate close to the display modules, and forms an included angle with the baseplate.

In the mosaic screen provided by the present disclosure, the light source is fixed on the inclined light source fixing plate and the light source fixing plate forms an included angle with the baseplate, thereby enabling the light emitted by the light source to irradiate to the center area of the box bottom and be reflected, which improves the amount of light reflected by the center area into human eyes, so as to be capable of improving brightness of the center area of the mosaic screen, and achieving the object of improving uniformity of brightness of the mosaic screen.

BRIEF DESCRIPTION OF THE DRAWINGS

In order to explain the technical solutions in the embodiments of the present disclosure or the prior art more clearly, the drawings to be used in the description of the embodiments will be introduced briefly next. Apparently, the drawings described below are only some embodiments of the present disclosure. The skilled person in the art, on the premise of not paying any creative work, can also obtain other drawings based on these drawings.

DETAILED DESCRIPTION

Explanations of Reference Signs
1—box body; 2—display module; 3—lamp panel; 31—baseplate; 32—light source fixing plate; 33—connecting mechanism; 34—occlusion part; 35—reflecting plate; 4—exhibition object.

The technical solutions in the embodiments of the present disclosure will be described clearly and completely with reference to the drawings. Obviously, the embodiments described are only a part of rather than all embodiments of the present disclosure. Based on the embodiments of the present disclosure, all other embodiments obtained by the ordinary skilled person in the art on the premise of not paying any creative work belong to the protection scope of the present disclosure.

Figure 3:
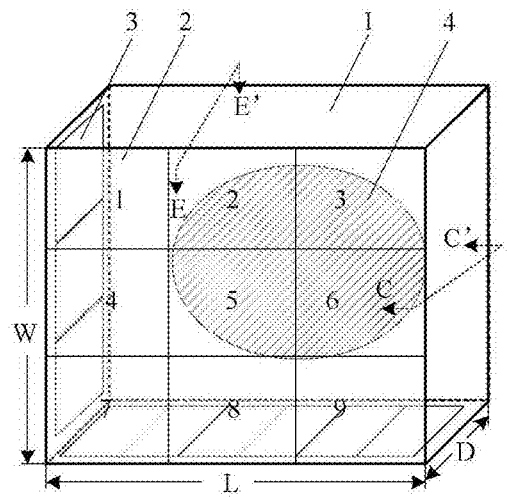
FIG. 3 is a structural view of a mosaic screen according to an embodiment of the present disclosure.
Figure 4:
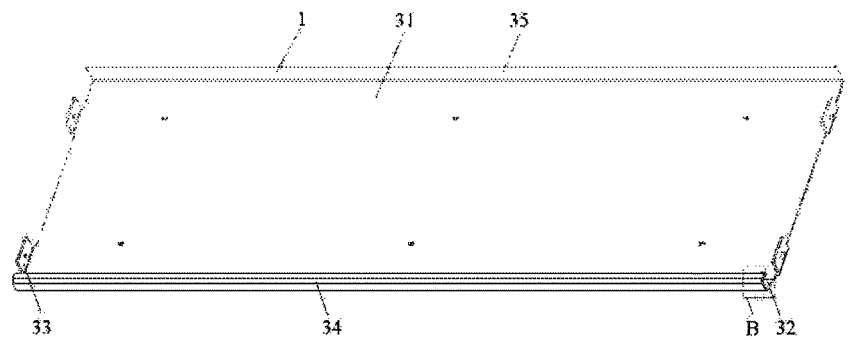
FIG. 4 is a structural view of a lamp panel according to an embodiment of the present disclosure.
Figure 5:
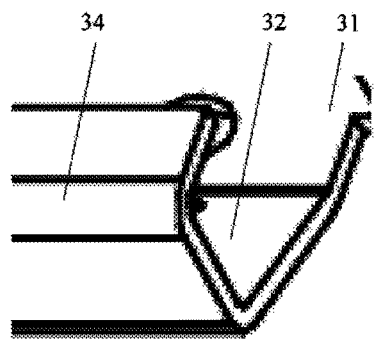
FIG. 5 is an enlarged view of area B in FIG. 4.

An embodiment of the present disclosure provides a mosaic screen, as shown in FIG. 3. The mosaic screen comprises a box body 1, a backlight module and a plurality of display modules 2 spliced with each other. The box body 1 comprises four side walls and one box bottom. The plurality of display modules 2 and the box bottom are oppositely fixed on the box body 1. The backlight module comprises a plurality of lamp panels 3 arranged on the four side walls successively along the circumferential direction of the box body 1. As shown in FIG. 4 and FIG. 5, each lamp panel 3 comprises: a baseplate 31, a light source fixing plate 32, and a light source fixed on the light source fixing plate 32. The light source fixing plate 32 is located at a side close to the display modules 2, is connected with a first side of the baseplate 31 close to the display modules 2, and forms an included angle with the baseplate 31. Exemplarily, the shape of the baseplate 31 is a rectangle. Exemplarily, the above display modules 2 can be liquid crystal panels.

The length of each lamp panel 3 along the extending direction of the light source fixing plate 32 can be the same as the length of the side wall corresponding to it and can also be less than the length of the side wall corresponding to it. When the length of each lamp panel 3 along the extending direction of the light source fixing plate 32 is the same as the length of the side wall corresponding to it, only one lamp panel 3 needs to be arranged on each side wall. Alternatively, when the length of each lamp panel 3 along the extending direction of the light source fixing plate 32 is less than the length of the side wall corresponding to it, a plurality of lamp panels 3 are arranged on each side wall. In this way, the lamp panel 3 has better flexibility, because the lamp panels 3 described above can be applied in mosaic screens of different sizes only by adjusting the number of them. Moreover, because the lamp panels 3 have the same size, it does not have to be designed separately as needed and it is easy to transport.

Exemplarily, as shown in FIG. 3, when the mosaic screen comprises nine display modules 2 of 55 inches spliced with each other, the backlight module comprises eighteen lamp panels 3, wherein six lamp panels 3 are arranged on each of the two relatively long side walls of the box body 1, and three lamp panels 3 are arranged on each of the two relatively short side walls of the box body 1. Here, the length of each lamp panel 3 located on the two relatively long side walls of the box body 1 along the extending direction of the light source fixing plate 32 is approximately ⅙ of the length of the box body 1. The length of each lamp panel 3 located on the two relatively short side walls of the box body 1 along the extending direction of the light source fixing plate 32 is approximately ⅓ of the width of the box body 1. When the above lamp panel 3 is applied in mosaic screens of other sizes, for example, applying the above lamp panel 3 in a mosaic screen comprising four display modules 2 of 55 inches spliced with each other, it only needs to arrange four lamp panels 3 on each of the two relatively long side walls of the body box, and arrange two lamp panels on each of the relatively short side walls of the box body 1.

The lamp panels 3 are detachably connected on the side walls of the box body 1. Exemplarily, as shown in FIG. 4, a plurality of screw holes are arranged on the baseplate 31. A single lamp panel 3 can be detachably connected with the side walls through the screw holes on the baseplate 31. The lamp panel 3 can comprise a plurality of connecting mechanisms 33 located on two sides of the baseplate 31. Exemplarily, the connecting mechanisms 33 can be connecting sheets, with at least one screw hole arranged on each connecting sheet. Detachable connection between two adjacent lamp panels 3 is realized by connecting the screw holes on the connecting sheets of the two adjacent lamp panels 3 through bolts. Alternatively, the connecting mechanisms 33 can be slots. Detachable connection between two adjacent lamp panels 3 is realized by connecting slots of the two adjacent lamp panels through pins. The skilled person in the art can also think of other connecting manners to realize detachable connection between two adjacent lamp panels 3.

When the mosaic screen is applied in exhibition occasions, as shown in FIG. 3, an exhibition object 4 is placed on the box bottom. The exhibition object 4 is for example a sandbox, an illustration of model etc. In the exhibition process, the display module 2 is in a transparent state. The light emitted by the light source irradiates onto the exhibition object 4, and is reflected by the exhibition object 4 out of the display module 2, thereby reaching human eyes. In the exhibition process, the display module 2 can also display contents such as the introduction information of the exhibition object 4 at an appropriate position, for the convenience of visitors to learn the exhibition object 4.

In the mosaic screen provided by the embodiment of the present disclosure, the light source is fixed on the inclined light source fixing plate and the light source fixing plate forms an included angle with the baseplate, thereby enabling the light emitted by the light source to irradiate to the center area of the box bottom and be reflected, which improves the amount of light reflected by the center area into human eyes, so as to be capable of improving brightness of the center area of the mosaic screen, and achieving the object of improving uniformity of brightness of the mosaic screen.

In addition, because the mosaic screen provided by the embodiment of the present disclosure does not comprise a diffuser plate, it can not only reduce the width of the non-display area of the mosaic screen so as to enable the mosaic screen to be well formed, but also can avoid various technical problems caused by using the diffuser plate in the prior art. For example, when a whole diffuser plate is used on one side wall, it may result in technical problems that the support difficulty of the diffuser plate will be high, collapse or protrusion may easily occur in the middle, and the transport and installation difficulty of the diffuser plate will be high; and when a plurality of diffuser plates spliced with each other are used on one side wall, shadows may be produced at the seams, which results in the technical problem of decrease of the visual effect of the mosaic screen.

The light source can comprises a plurality of chip on board light emitting diodes (COB LEDs). The plurality of COB LEDs are arranged successively on the light source fixing plate 32 along the extending direction of the side wall. Because the chips of the COB LED have good heat dissipation, high light efficiency, and short manufacturing cycle, when the COB LED is used as the light source, it can not only increase the brightness of the light source and enlarge the promotion range of the brightness, but also can make the light source to have excellent heat dissipation performance, meanwhile, it can also lower the cost of the light source. Exemplarily, the plurality of COB LEDs fixed on each light source fixing plate 32 are connected with each other using pressing lines. The number of the COB LEDs fixed on each light source fixing plate 32 should be determined by many factors such as the brightness of the COB LEDs, the brightness required by the mosaic screen and the transmittance of the display module. Exemplarily, the number of the COB LEDs fixed on each light source fixing plate 32 can be 20~24, preferably 20.

Further, the number of the COB LEDs fixed on the light source fixing plate 32 in each lamp panel 3 can be the same, and can also be adjusted correspondingly based on the position of the lamp panel 3, so as to further improve uniformity of brightness of the mosaic screen. Exemplarily, as shown in FIG. 3, the mosaic screen comprises nine display modules of 55 inches spliced with each other. The ninth display modules are labeled as display modules numbered 1~9. Because the display modules numbered 1, 3, 7, 9 are adjacent to two side walls of the box body, while the display modules numbered 2, 4, 6, 8 are only adjacent to one side wall of the box body, if the number of the COB LEDs fixed on the light source fixing plate 32 of each lamp panel 3 is the same, it may render the positions of the display modules numbered 2, 4, 6, 8 relatively dark. The brightness at the positions of the display modules numbered 2, 4, 6, 8 differs greatly from the brightness at the positions of the display modules numbered 1, 3, 7, 9, which is not benefit for improving uniformity of brightness of the mosaic screen. The difference between the brightness at the positions of the display modules numbered 2, 4, 6, 8 and the brightness at the positions of the display modules numbered 1, 3, 7, 9 can be reduced by enabling the number of COB LEDs fixed on the light source fixing plate 32 in the lamp panel 3 corresponding to the display modules numbered 2, 4, 6, 8 to be relatively large and enabling the number of COB LEDs fixed on the light source fixing plate 32 in the lamp panel 3 corresponding to the display modules numbered 1, 3, 7, 9 to be relatively small, so as to further improve uniformity of brightness of the mosaic screen.

Similarly, the power of the COB LEDs fixed on the light source fixing plate 32 in each lamp panel 3 can be the same and can also be different. When the power of the COB LEDs fixed on the light source fixing plate 32 in each lamp panel 3 is the same, the structure of the backlight module is relatively simple. When the power of the COB LEDs fixed on the light source fixing plate 32 in each lamp panel 3 is different, the structure of the backlight module is relatively complex; however, it can further improve the uniformity of brightness of the mosaic screen. Specifically, for the mosaic screen as shown in FIG. 3, the difference between the brightness at the positions of the display modules numbered 2, 4, 6, 8 and the brightness at the positions of the display modules numbered 1, 3, 7, 9 can be reduced by enabling the power of the COB LEDs fixed on the light source fixing plate 32 in the lamp panel 3 corresponding to the display modules numbered 1, 3, 7, 9 to be relatively large and enabling the power of the COB LEDs fixed on the light source fixing plate 32 in the lamp panel 3 corresponding to the display modules numbered 2, 4, 6, 8 to be relatively small, so as to further improve uniformity of brightness of the mosaic screen.

Figure 6:
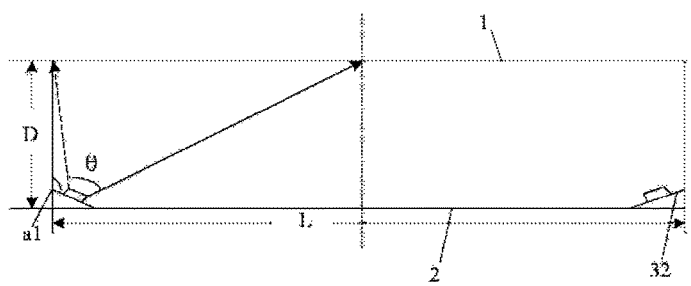
FIG. 6 is a sectional view of FIG. 3 along C-C' direction.

When the length and the width of the box body 1 are the same, the included angles formed between the light source fixing plates and the baseplates in a plurality of lamp panels arranged on four side walls can be the same. As shown in FIG. 6, the light emitted by each COB LED on the light source fixing plate in the lamp panel arranged on each side wall can irradiate to a range from the edge of the box bottom to a position which is L/2 from the side wall, wherein L is the length of the box body 1, thereby enabling the light emitted by all COB LEDs to cover the whole box bottom. As shown in FIG. 6, the size of the included angle α1 formed between the light source fixing plate 32 and the baseplate 31 is determined synthetically based on the length L of the box body 1, the thickness D, and the light emitting angle θ of the COB LED. Specifically, when the light emitting angle θ of the COB LED is fixed, the larger the length L of the box body 1 is, the larger the included angle α1 formed between the light source fixing plate 32 and the baseplate 31 will be, and the smaller the thickness D of the box body 1 is, the larger the included angle α1 formed between the light source fixing plate 32 and the baseplate 31 will be.

Next, the structure of the light source fixing plate 32 therein will be described in detail by taking the example that the length L of the box body 1 is 3.6~3.8 m (e.g., 3.6 m), the width W of the box body 1 is 2.0~2.2 m (e.g., 2.1 m), and the thickness D of the box body 1 is 0.55~0.75 m (e.g., 0.55 m).

Exemplarily, the length of each lamp panel 3 along the extending direction of the light source fixing plate 32 is 535~560 mm, preferably 535 mm, and the width of each lamp panel 3 along a direction perpendicular to the extending direction of the light source fixing plate 32 is 550~750 mm. It should be noted that the length and the width of the lamp panel 3 are not limited to the above values. The length of the lamp panel 3 along the extending direction of the light source fixing plate 32 can be set based on the width of the display module 2, so as to enable the splicing between the lamp panels 3 to have a minimum influence on the display effect of the mosaic screen as far as possible. Exemplarily, as shown in FIG. 3, when the mosaic screen comprises nine display modules 2 spliced with each in the form of 3*3, and the size of each display module 2 is 1150 mm*635 mm, the mosaic screen can comprises eighteen lamp panels 3 with the above size. The width of the lamp panel 3 along a direction perpendicular to the extending direction of the light source fixing plate 32 can be equal or close to the thickness D of the box body 1.

Exemplarily, the width of the light source fixing plate 32 is 20~26 mm.

Exemplarily, as shown in FIG. 3, when the light emitting angle θ of the COB LED is −60°~60°, the included angle α1 formed between the light source fixing plate 32 and the baseplate 31 is 108°~113°, preferably 110°, so as to enable the light emitted by all COB LEDs to cover the whole box bottom.

Figure 7:
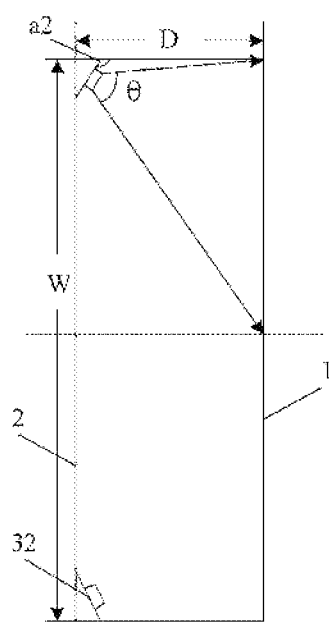
FIG. 7 is a sectional view of FIG. 3 along E-E' direction.

Alternatively, when the length and the width of the box body 1 are different, the included angles formed between the light source fixing plates 32 and the baseplates 31 in the lamp panels 3 arranged on two relatively long side walls are less than the included angles formed between the light source fixing plates 32 and the baseplates 31 in the lamp panels 3 arranged on two relatively short side walls, so as to enable the light emitted by all COB LEDs to cover the whole box bottom. As shown in FIG. 7, the light emitted by COB LEDs on the light source fixing plates 32 in the lamp panels 3 arranged on the two relatively long side walls can irradiate to a range from the edge of the box bottom to a position which is W/2 from the side wall, wherein W is the width of the box body 1. The included angle α2 formed between the light source fixing plate 32 and the baseplate 31 is determined synthetically by the width W of the box body 1, the thickness D, and the light emitting angle θ of the COB LED. Specifically, when the light emitting angle θ of the COB LED is fixed, the larger the width W of the box body 1 is, the larger the included angle α2 formed between the light source fixing plate 32 and the baseplate 31 will be, and the smaller the thickness D of the box body 1 is, the larger the included angle α2 formed between the light source fixing plate 32 and the baseplate 31 will be. The light emitted by the COB LEDs on the light source fixing plates 32 in the lamp panels 3 arranged on the two relatively short side walls can irradiate to a range from the edge of the box bottom to a position which is L/2 from the side wall, wherein L is the length of the box body 1. The included angle α1 formed between the light source fixing plate 32 and the baseplate 31 is determined synthetically based on the length L of the box body 1, the thickness D, and the light emitting angle θ of the COB LED. Specifically, when the light emitting angle θ of the COB LED is fixed, the larger the length L of the box body 1 is, the larger the included angle α1 formed between the light source fixing plate 32 and the baseplate 31 will be, and the smaller the thickness D of the box body 1 is, the larger the included angle α1 formed between the light source fixing plate 32 and the baseplate 31 will be.

As shown in FIG. 4 and FIG. 5, the lamp panel 3 can further comprise an occlusion part 34 extending from a side of the light source fixing plate 32 away from the baseplate 31. The occlusion part 34 and the light source fixing plate 32 form a bending structure. The occlusion part 34 can prevent too much light from being emitted from the peripheral of the mosaic screen effectively, thereby being capable of preventing glare phenomenon at peripheral of the mosaic screen effectively, which is beneficial to improving the display effect of the mosaic screen. Exemplarily, the cross section shape of the bending structure formed by the occlusion part 34 and the light source fixing plate 32 can be a triangle or a trapezoid.

In addition, the utilization rate of the light emitted by the light source can also be improved in the following ways: first, covering the light source fixing plate 32 with a reflecting layer, so as to reflect the light emitted onto the light source fixing plate 32 to enable it to be utilized again; second, covering the occlusion part 34 with a reflecting layer, so as to reflect the light occluded by the occlusion part 34 to enable it to be utilized again; third, covering the baseplate 31 with a reflecting layer, so as to improve reflecting effect of the baseplate to the light; fourth, the lamp panel 3 further comprises a reflecting plate 35, which is connected with a second side of the baseplate 31 away from the display module 2, with the second side arranged opposite to the first one. The reflecting plate 35 can reflect the light emitted to it and enable it to be utilized again.

The materials of the baseplate 31, the light source fixing plate 32, the connecting mechanism 33, the occlusion part 34 and the reflecting plate 35 comprised by the lamp panel 3 are all aluminum, so as to enable the heat dissipation performance of the lamp panel 3 to be good, which is beneficial to maintaining performance stability of the light source, thereby maintaining performance stability of the backlight module.

Figure 1:
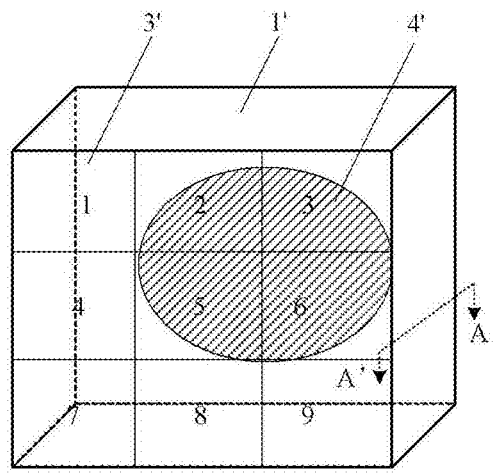
FIG. 1 is a structural view of a mosaic screen in the prior art.
Figure 2:
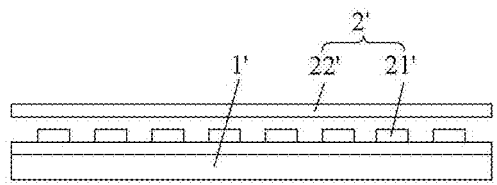
FIG. 2 is a sectional view of FIG. 1 along A-A' direction.

In order to facilitate the skilled person in the art to understand the advantages of the mosaic screen in embodiments of the present disclosure, next, the mosaic screen in the prior art will be compared with the mosaic screen in embodiments of the present disclosure as follows:

The same point of the mosaic screens in the prior art and the embodiments of the present disclosure lies in that the mosaic screens both comprise nine display modules of 55 inches spliced with each other. The different point of the mosaic screens in the prior art and the embodiments of the present disclosure lies in that, as shown in FIG. 1 and FIG. 2, the backlight module 2' of the mosaic screen in the prior art comprises an LED light source 21' and a diffuser plate 22'. As shown in FIG. 3, the backlight module of the mosaic screen in embodiments of the present disclosure comprises eighteen lamp panels 3, wherein six lamp panels 3 are arranged on each of the two relatively long side walls, and three lamp panels 3 are arranged on each of the two relatively short side walls. As shown in FIG. 4 and FIG. 5, the included angle formed between the light source fixing plate 32 and the baseplate 31 on each lamp panel 3 is 110°. The light source is a COB LED. Twenty COB LEDs are fixed on the light source fixing plate 32 of each lamp panel 3. The parameters of the COB LED is as follows: type (Part Number): MC-13BT-930-H-0305-C; correlated color temperature (CCT): 9300 K; luminous flux (Flux): 320 lm; energy efficiency level (Eff): 118 lm/W; voltage: 9V; current: 300 mA.

The target performance to be achieved by the mosaic screen in the prior art and the mosaic screen in embodiments of the present disclosure is: the power consumption of the light source is 1202 W, and the brightness of the center area is 100 nit.

The test result indicates that the power consumption of the LED light source 21' of the mosaic screen in the prior art is up to 1280 W, and the brightness of the center area is 70 nit, while the power consumption of the COB LED of the mosaic screen in the embodiments of the present disclosure is only 1162.2 W, and the brightness of the center area is 100.4 nit. To sum up, the power consumption of the mosaic screen in the prior art is high and the center brightness is not up to standard, while the mosaic screen in embodiments of the present disclosure can meet the brightness requirement of the center area in case of a relatively low power consumption.

What are stated above are only specific implementations of the present disclosure. However, the protection scope of the present disclosure is not limited to this. Any modifications or replacements that can be easily conceived by the skilled person familiar with the present technical field within the technical scope disclosed by the present disclosure should be encompassed within the protection scope of the present disclosure. Therefore, the protection scope of the present disclosure should be subject to the protection scopes of the claims attached.

The invention claimed is:

1. A mosaic screen, comprising a box body, a backlight module and a plurality of display modules spliced with each other, the box body comprising four side walls and one box bottom, the one box bottom being surrounded by the four side walls, the one box bottom and the four side walls together forming a box for accommodating an object, the plurality of display modules being surrounded by the four side walls and opposite to the box bottom, wherein the backlight module comprises lamp panels, a plurality of lamp panels being arranged on each of the four side walls, each of the lamp panels comprises: a baseplate, a light source fixing plate, and a light source fixed on the light source fixing plate, wherein the baseplate is mounted on inner side of the side walls, the light source fixing plate is connected with a first side of the baseplate close to the display modules, and forms an included angle with the baseplate, and wherein the light emitted by the light source directly irradiates to the center area of the box bottom.

2. The mosaic screen according to claim 1, wherein the light source comprises a plurality of light emitting diodes packaged using chip-on-board (COB) package mode, the plurality of light emitting diodes are arranged in sequence on the light source fixing plate along an extending direction of the side wall.

3. The mosaic screen according to claim 2, wherein the length and the width of the box body are the same, the included angles formed between the light source fixing plates and the baseplates in the plurality of lamp panels on the four side walls are the same, and the light emitted by the light emitting diodes on each side wall can irradiate to a range from the edge of the box bottom to a position which is L/2 from the side wall, wherein L is the length of the box body.

4. The mosaic screen according to claim 3, wherein a length of each of the lamp panels along the extending direction of the light source fixing plate is 535~560 mm, a width of each of the lamp panels along a direction perpendicular to the extending direction of the light source fixing plate is 550~750 mm.

5. The mosaic screen according to claim 3, wherein a width of the light source fixing plate is 20~26 mm.

6. The mosaic screen according to claim 3, wherein the included angle formed between the light source fixing plate and the baseplate is 108°~113° when the light emitting angle of the light emitting diodes is −60°~60°.

7. The mosaic screen according to claim 2, wherein the length and the width of the box body are different, the included angle formed between the light source fixing plate and the baseplate in each lamp panel arranged on the two relatively long side walls is less than the included angle formed between the light source fixing plate and the baseplate in each lamp panel arranged on the two relatively short side walls, the light emitted by the light emitting diodes on the light source fixing plates in each lamp panel arranged on the two relatively long side walls can irradiate to a range from the edge of the box bottom to a position which is W/2 from the side wall, the light emitted by the light emitting diodes on the light source fixing plates in each lamp panel arranged on the two relatively short side walls can irradiate to a range from the edge of the box bottom to a position which is L/2 from the side wall, wherein L is the length of the box body, W is the width of the box body.

8. The mosaic screen according to claim 7, wherein the length of the box body is 3.6~3.8 m, the width of the box body is 2.0~2.2 m, the thickness of the box body is 0.55~0.75 m.

9. The mosaic screen according to claim 1, wherein the light source fixing plate is covered with a reflecting layer.

10. The mosaic screen according to claim 1, wherein the lamp panel further comprises an occlusion part extending from a side of the light source fixing plate away from the baseplate, the occlusion part and the light source fixing plate form a bending structure.

11. The mosaic screen according to claim 10, wherein the occlusion part is covered with a reflecting layer.

12. The mosaic screen according to claim 10, wherein the cross section shape of the bending structure formed by the occlusion part and the light source fixing plate is a triangle or a trapezoid.

13. The mosaic screen according to claim 1, wherein the baseplate is covered with a reflecting layer.

14. The mosaic screen according to claim 1, wherein the lamp panel further comprises a reflecting plate, the reflecting plate is connected with a second side of the baseplate away from the display module, the second side is arranged opposite to the first side.

15. The mosaic screen according to claim 1, wherein the lamp panel is detachably connected to the side walls of the box body.

16. The mosaic screen according to claim 15, wherein the lamp panel further comprises a plurality of connecting mechanisms located on a third side of the baseplate and a fourth side opposite to the third side.

17. The mosaic screen according to claim 11, wherein the cross section shape of the bending structure formed by the occlusion part and the light source fixing plate is a triangle or a trapezoid.

* * * * *